April 6, 1926.
J. WISEMAN ET AL
1,579,427
SIGNAL RELAY SYSTEM
Filed April 14, 1925
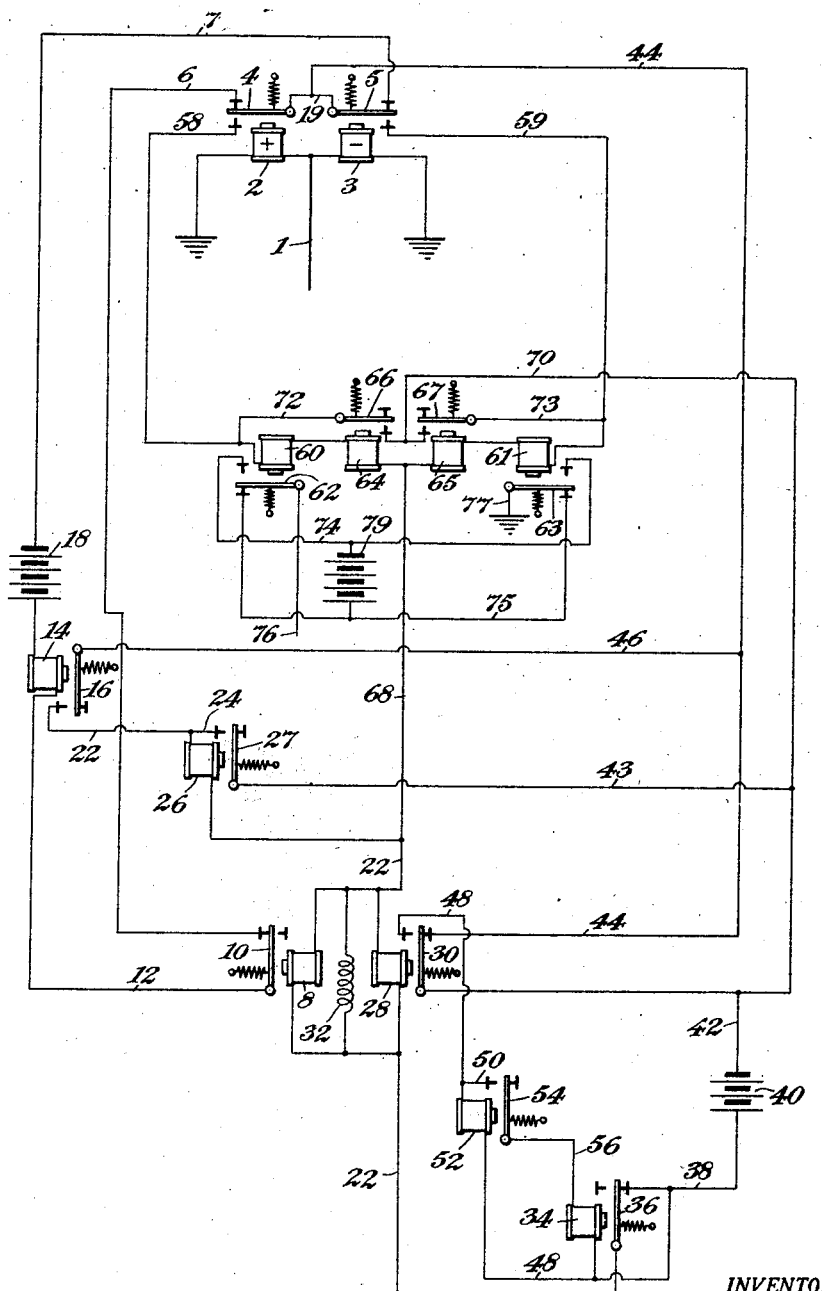
INVENTORS,
John Wiseman.
Alexander Cunningham.
BY Andrew Wilson.
ATTORNEY.

Patented Apr. 6, 1926.

1,579,427

UNITED STATES PATENT OFFICE.

JOHN WISEMAN AND ALEXANDER CUNNINGHAM, OF BROOKLYN, NEW YORK.

SIGNAL RELAY SYSTEM.

Application filed April 14, 1925. Serial No. 23,096.

*To all whom it may concern:*

Be it known that we, JOHN WISEMAN and ALEXANDER CUNNINGHAM, both citizens of the United States, and residents of the borough of Brooklyn, city and State of New York, have invented certain new and useful Improvements in Signal Relay Systems, of which the following is a specification.

Our invention relates to improved means for relaying electrical signals, such as are transmitted by submarine cables and the like, employing electrical impulses of opposed polarities.

The principal object of our invention is to so relay the received signals, which sometimes lose their proper definiteness in transmission, so that the transmitted signals shall be perfected reproductions of the received signals as sent as regards duration of time, and the marking period of each signal element, and of the spacing periods between letters and words, and to accomplish this solely by means of electromagnetic relays, timing resistance, condensers and batteries.

Another object of our invention is to so arrange the relay system that it shall operate automatically in the reception and transmission of the relay signals.

Another object of our invention is to accomplish the desired result by automatically relaying the received signals with any predetermined lengths of recording and spacing signals.

Still another object of our invention is to accomplish this by the use of electric batteries and electromagnetic relays only in combination with the appropriate circuits.

We will now proceed to illustrate and explain the system embodying our improvements, referring in so doing to the accompanying drawing which shows a diagrammatic plan of an improved electromagnetic relay system interposed between lines for receiving and sending cable messages.

The main line or cable 1 carries the incoming signals to electromagnetic relays 2, 3, and through them to ground, the relays being wound so that relay 2 responds to electrical impulses of one polarity and relay 3 to impulses of the opposite polarity. Relay 2 controls the armature 4, which is normally in contact with the terminal of line 6; and relay 3 similarly controls the armature 5 normally in contact with the terminal of line 7. Line 6 connects with normally closed armature 10 of relay 8, from which armature the line 12 continues to and through relay 14 to battery 18; from which battery line 7 connects with armature 5, the circuit being completed over line 19.

For simplification we will hereafter refer to this circuit as circuit A.

A line 22, having a branch 24, extends to relay 26, relay 8, relay 28, and timing resistance 32, to armature 36, line 38, to battery 40, from which battery line 42 extends to armature 30, lines 44, 46 and armature 16. Armatures 16 and 27 are normally open, and armatures 36 and 30 are normally closed.

This circuit will hereafter be referred to as circuit B.

The line 44 also extends from circuit B to line 19.

A circuit may also be traced from battery 40, through line 42, line 43, armature 27, line 24, relay 26, line 22, relays 8, 28 and resistance 32, armature 36, line 38 and back to battery.

This circuit will hereafter be referred to as circuit C.

Another circuit extends from battery 40, through line 42, to armature 30, line 48 provided with a branch 50, relay 52, to line 48, line 38, and back to battery 40.

This circuit will hereafter be referred to as circuit D.

A modification of circuit D is read from the line 48, through branch 50, normally open armature 54, line 56, relay 34, to line 48, and back to battery as before.

This variation will hereafter be referred to as circuit E.

Another circuit may be traced from battery 40, through line 42, armature 30, line 44, line 19, armature 4, line 58, relays 60 and 64, line 68, line 22, relays 8 and 28 and resistance 32, armature 36 and line 38, back to battery.

Hereafter we will refer to this circuit as circuit F.

A branch 72 from line 58 extends to armature 66 adapted to close with line 70 extending to line 42 and battery 40.

This modification of circuit F will hereafter be referred to as circuit G.

Relay 60 controls armature 62 adapted to close the circuit from ground through line 77, armature 63, line 75, battery 79, line 74, armature 62, and through sending line 76 to distant ground.

Hereafter this circuit will be referred to as circuit H.

Another circuit may also be completed as follows. From battery 40, through line 42, armature 30, line 44, line 19, armature 5, line 59, through relays 61 and 65, through line 68, line 22, relays 8 and 28, resistance 32, armature 36, line 38, back to battery 40.

This circuit will hereafter be referred to as circuit I.

Line 59 is provided with a branch 73, leading to an armature 67 controlled by relay 65, adapted to be closed thereby with line 70 connecting with line 42 and battery 40.

This modified circuit will be hereafter referred to as circuit J.

A circuit may then be read from line 76 to armature 62, line 75, battery 79, line 74, armature 63, line 77 to ground.

This circuit will hereafter be referred to as circuit K.

The operation of our improved system is as follows:—

When no signals are coming in over the cable 1, and the relays 2 and 3 are de-energized, circuit A will be closed so as to form a path for the current from battery 18. The flow of the current through circuit A energizes relay 14 and closes armature 16, completing the circuit B including battery 40. The flow of the current through circuit B is slightly delayed by its triple path through relays 8 and 28 and resistance 32.

The flow of the current through circuit B energizes the relay 26 and closes the armature 27 with branch 24, thus completing the circuit C, the circuit being locked against interference from a break in circuit B at armatures 16 or 30. This is necessary because the relays at 8 and 28 are also actuated, but more slowly than relay 26, causing the following train of operation:—

Armature 10 opens and breaks circuit A, de-energizing relay 14, and causing armature 16 to break circuit B. Circuit C, however, remains closed because the armature 27 is locked by the action of relay 26. Simultaneously with the breaking of circuit A, relay 28 causes armature 30 to break circuit B, thus cutting off battery 40 from armatures 4, 5 and 16, thus insuring the completion of the desired train of operation by preventing any further incoming impulses of either polarity or the space impulses from interfering or starting a separate train of operation, until relay 28 is de-energized, and armature 30 is again closed with line 44 due to the consequent opening of armature 36. The closing of armature 30 with line 48 completes circuit D, energizing relay 52, and causing armature 54 to close with branch 50, thus completing circuit E. The closing of circuit E energizes relay 34 and causes armature 36 to open, which de-energizes relay 28, thereby releasing armature 30 and breaking circuits D and E, and thus directly or indirectly causes all relays energized by battery 40 to be de-energized, and permits them to return to their normal positions.

As soon as armature 10 closes circuit A, the cycle of operations just described repeats itself, and will continue to do so indefinitely, so long as the foregoing arrangement is not interfered with.

However, when an impulse of definite polarity, received directly or indirectly over the main line 1, energizes relay 2, circuit A will be broken by the drawing down of armature 4 into contact with line 58, and the cycle of operations just above described will be automatically suspended. The closing of armature 4 with line 58 completes circuit F. The current in circuit F energizes relay 60, causing it to close armature 62 with line 74, thus completing circuit H.

The instant this circuit is completed marks the beginning of the time of sending out an impulse of definite polarity from the relay system herein described over the sending line 76. The duration of time of this impulse is predetermined and constant for each similar impulse of either polarity. The adjustment of the relay gaps and spring tensions and the value of the timing resistance 32 determine this duration of impulse in the following cycle of events;—

Relay 64 will be energized at the same time as relay 60, closing armature 66, and completing circuit G, and locking it against interference at relays 2 or 30. Relays 8 and 28 are energized, but their action is retarded after that of relays 60, 64 by resistance 32.

The opening of the armature 10 prevents the operation of circuit A, even if an incoming signal over line 1 should permit the armature 4 to close with line 6.

The opening of armature 30 cuts off the battery 40 from armatures 4, 5 and 16, as already pointed out, thus insuring the completion of the desired train of operations by preventing any further incoming impulses, of either polarity, or a space impulse, from interfering, or starting a separate train of operations until relay 28 is de-energized and armature 30 is again closed with line 44, due to the closing of armature 36 with line 38.

The closing of relay 30 completes circuit D; which, in turn, completes circuit E, opening circuit B at relay 36 as already described, de-energizing all the relays supplied by battery 40 and allowing them to return to normal positions. This allows the relay 62 to open, which terminates the transmitted signal.

The instant of the closing of armatures 62 marks the beginning of the transmitted signal; and the instant of its opening, marks the termination of the signal; and it will be obvious that the duration of the signal will be measured by the time occupied by the system in completing the cycle above described, between the closing and the opening of the armature 62.

We have explained the cycles of operations in spacing, and in sending a signal of a given polarity. If the signal is of the opposed polarity to that assumed in the above explanation, relay 3 will be energized, and circuit I will be closed, in turn closing armature 67 and completing circuit J, the consequent energizing of relay 61 closing circuit K and resulting in the production of the relayed signal in the sending line circuit.

If two or more impulses of the same polarity follow each other so as keep either of relays 4 or 5 closed for a period of time longer than the predetermined duration of one signal element, the cycle of operation following the closing of circuit F or I, as the case may be, will repeat itself the number of times covered by such successive impulses of the same polarity, thus producing in the sending circuit, a corresponding number of distinct signals, each definite and complete of itself.

We wish it to be understood that the system which we have diagrammatically illustrated, and described above is to be considered as a typical and not an exclusive embodiment of the principles of our invention. For, as will be understood by those skilled in the art, the details of arrangements may be modified, as by the use of equivalents, without departing from the spirit of our invention as claimed.

Having thus described our invention, what we claim and desire to secure by Letters Patent of the United States is:—

1. In a system for relaying incoming electric signals varying in duration and separation, the combination, with receiving and sending main line circuits, of a plurality of local relay circuits, means for producing electrical currents in the local circuits, and successively acting electromagnetic relays included in the circuits, whereby the local circuits are automatically, successively closed by each other in a recurring cycle of operation during the inaction of a main line circuit.

2. In a system for relaying incoming electric signals varying in duration and separation, the combination, with receiving and sending main line circuits, of a plurality of local relay circuits, means for producing electrical currents in the local circuits, and successively acting electromagnetic relays included in the circuits, whereby the local circuits are automatically, successively closed and opened by each other in a recurring cycle of operation during the inaction of a main line circuit.

3. In a system for relaying incoming electric signals varying in duration and separation, the combination, with receiving and sending main line circuits, of a plurality of local relay circuits, means for producing electrical currents in the local circuits, and successively acting electromagnetic relays included in the circuits, whereby the local circuits are automatically, successively closed by each other in a recurring cycle of spacing operation during the inaction of a main line circuit.

4. In a system for relaying incoming electric signals varying in duration and separation, the combination, with receiving and sending main line circuits, of a plurality of local relay circuits, means for producing electrical currents in the local circuits, and successively acting electromagnetic relays included in the circuits, a plurality of such local circuits being automatically, successively closed by each other, in a recurring cycle of operation, during the inaction of a main line circuit, and an incoming main line signal causing another plurality of such local circuits to be automatically, successively closed by each other, in a cycle of signaling operation.

5. In a system for relaying incoming electric signals varying in duration and separation, the combination, with receiving and sending main line circuits, of a plurality of local relay circuits, timing resistance therein, means for producing electrical currents in the local circuits, and successively acting electromagnetic relays included in the circuits, whereby the local circuits are automatically, successively closed by each other in a recurring cycle of operation.

6. In a system for relaying incoming electric signals varying in duration and separation, the combination, with receiving and sending main line circuits, of a plurality of local relay circuits, means for producing electrical currents in the local circuits, and successively acting electromagnetic relays included in the circuits, whereby the local circuits are automatically, successively closed by each other in a recurring cycle of operation each cycle occupying the predetermined time of a spacing interval.

7. In a system for relaying incoming electric signals varying in duration and separation, the combination, with receiving and sending main line circuits, of a plurality of local relay crcuits, means for producing electrical currents in the local circuits, and successively acting electromagnetic relays included in the circuits, whereby the local circuits are automatically, successively closed by each other in a recurring cycle of operation each cycle occupying the predetermined time of a signal.

8. In a system for relaying incoming electric signals varying in duration and separation, the combination, with receiving and sending main line circuits, of a plurality of local relay circuits, means for producing electrical currents in the local circuits, and successively acting electromagnetic relays included in the circuits, whereby the local circuits are automatically, successively closed by each other in a plurality of sets of recurring cycles of operation each cycle of one set occupying the predetermined time of a spacing interval, and each cycle of another set occupying the predetermined time of a signal.

9. In a system for relaying incoming electric signals varying in duration and separation, the combination, with receiving and sending main line circuits, of a plurality of local relay circuits, means for producing electrical currents in the local circuits, and successively acting electromagnetic relays included in the circuits, whereby the local circuits are automatically, successively closed by each other in a recurring cycle of operation, and automatic means for preventing the interruption of a cycle during its progress.

10. The improved method of relaying electrical signals employing character periods and spacing periods, consisting in the employment of a system of progressively energized local circuits, controlled by electromagnets therein, and having a cycle of operation occupying the time of a spacing period, and another system of progressively energized local circuits, interrelated with the first mentioned system and having a cycle of operation occupying the time of a character period, causing the initiation of such cycles by the influence of a receiving circuit, and causing the results of such cycles to be introduced into a sending circuit.

11. The improved method of relaying electrical signals consisting in creating a recurring spacing cycle of magnetically initiated steps, such cycle covering a predetermined spacing period, creating a signaling cycle of magnetically initiated steps such cycle covering a predetermined signaling period, causing an incoming signal to suspend the recurrence of a spacing cycle at its termination and to initiate a signaling cycle, preventing the interruption of any of such cycles, during their progress, by an incoming signal, and causing the signal cycles to dispatch signals into the sending line.

12. The improved method of relaying electrical signals consisting in creating a recurring spacing cycle of magnetically initiated steps, such cycle covering a predetermined spacing period, creating a signaling cycle of magnetically initiated steps such cycle covering a predetermined signaling period, causing an incoming signal to suspend the recurrence of a spacing cycle at its termination and to initiate a signaling cycle, preventing the interruption of any of such cycles, during their progress, by an incoming signal, causing the signal cycles to dispatch signals into the sending line, and causing the termination of an incoming signal to initiate a spacing cycle.

ALEXANDER CUNNINGHAM.
JOHN WISEMAN.